United States Patent [19]

Kamir et al.

[11] Patent Number: 5,155,782
[45] Date of Patent: Oct. 13, 1992

[54] ASSEMBLY OF ELONGATED ELEMENTS, PARTICULARLY A FIBRE OPTIC HEAD, AND A METHOD OF MAKING SAME

[75] Inventors: Yossi Kamir, Natanya; Zvi Krams; Serge Steinblatt, both of Raanana, all of Israel

[73] Assignee: Scitex Corporation Ltd., Herzlia Bet, Israel

[21] Appl. No.: 838,981

[22] Filed: Feb. 21, 1992

[30] Foreign Application Priority Data

Mar. 15, 1991 [IL] Israel ..................................... 97562

[51] Int. Cl.⁵ ............................................... G02B 6/36
[52] U.S. Cl. ........................................ 385/77; 385/114
[58] Field of Search .................. 385/77, 114, 115, 53, 385/54, 55, 59

[56] References Cited

U.S. PATENT DOCUMENTS

| | | | |
|---|---|---|---|
| 3,761,234 | 9/1973 | Siegmund | 385/114 |
| 3,920,432 | 11/1975 | Smith | 385/114 |
| 4,296,997 | 10/1981 | Malsot et al. | 385/77 |
| 4,305,642 | 12/1981 | Bloodworth, Jr. et al. | 385/114 |
| 4,496,215 | 1/1985 | Shaheen et al. | 385/114 |
| 5,020,874 | 6/1991 | Zell et al. | 385/53 |

*Primary Examiner*—Frank Gonzalez
*Attorney, Agent, or Firm*—Benjamin J. Barish

[57] ABSTRACT

An assembly of a plurality of optical fibres fixed in a precise linear array, includes a housing formed with an internal cavity having a flat supporting surface; and a first flat sheet extending perpendicularly to the flat supporting surface at one end of the cavity and having a flat edge abutting the flat supporting surface at one side of the cavity. A plurality of the optical fibres are supported in side-by-side relation on the flat supporting surface. A second flat sheet at the opposite side of the cavity presses the optical fibres into contacting relation with each other, and with the end optical fibre in contact with the first flat sheet; and a block in the upper end of the cavity presses all the optical fibres into contact with the flat supporting surface.

20 Claims, 1 Drawing Sheet

ASSEMBLY OF ELONGATED ELEMENTS, PARTICULARLY A FIBRE OPTIC HEAD, AND A METHOD OF MAKING SAME

FIELD AND BACKGROUND OF THE INVENTION

The present invention relates to an assembly of a plurality of elongated elements fixed in a precise linear array, and to a method of making such assemblies. The invention is particularly useful for making fibre optic heads in which the elongated elements are optical fibres, and the invention is therefore described below particularly with respect to such an application.

Fibre optic heads including a linear array of optical fibres are used in a number of applications. One application is in laser plotters, wherein each optical fibre of the head carries an independently-modulated signal which is transmitted from a stationary light source to a movable recording element in order to record images or patterns. However, laser plotters of high resolution require that the optical fibres be of very small diameter and that the fibre ends be fixed in a precise linear array as any deviation from a perfectly straight line will seriously affect the screen quality and line straightness of the plotter.

OBJECTS AND BRIEF SUMMARY OF THE INVENTION

An object of the present invention is to provide an assembly of a plurality of elongated elements fixed in a precise linear array, and particularly a fibre optic head including a precise linear array of optical fibres. Another object of the invention is to provide a method of making such assemblies and fibre optic heads.

According to the present invention, there is provided an assembly of a plurality of elongated elements fixed in a precise linear array, comprising: a housing formed with an internal cavity having a flat supporting surface at one side thereof; and a flat sheet extending perpendicularly to the flat supporting surface at a second side of the cavity and having a flat edge abutting the flat supporting surface. The plurality of the elongated elements are supported in side-by-side relation on the flat supporting surface. The assembly further includes first pressure means at a third side of the cavity opposite to the second side and pressing the elongated elements into contacting relation with each other the end elongated element into contact with the flat sheet; and second pressure means in a fourth side of the cavity opposite to the first side pressing all the elongated elements into contact with the flat supporting surface.

According to further features in the preferred embodiment of the invention described below, the assembly further includes an adhesive bonding the elongated elements to each other and to the housing. Also, the first pressure means comprises a second flat sheet extending parallel to the flat supporting surface and engageable with the elongated element at the third side of the cavity, and elastic means for pressing the second sheet towards the first-mentioned sheet. In addition, the elastic means includes a third sheet having a first section parallel to the first-mentioned sheet, a second section parallel to the second sheet and aligned therewith, and a bent elastic juncture joining the first and second sections. Further, the elastic means further includes a threaded pin passing through a wall of the housing and through the first section of the third sheet.

According to still further features in the preferred embodiment of the invention described below, the elongated elements are optical fibres, and are each of a diameter of less than ½ mm.

The invention also provides a method of making the above assembly of elongated elements, and particularly of optical fibres.

As will be described more particularly below, the foregoing features of the invention enable assemblies of elongated elements, particularly heads of optical fibres, to be prepared having a very precise linear array with very little deviation from a straight line even though elongated elements, or optical fibres, of very small diameters, in the order of 125 microns, are used in the assembly.

Further features and advantages of the invention will be apparent from the description below.

BRIEF DESCRIPTION OF THE DRAWINGS

The invention is herein descsribed, by way of example only, with reference to the accompanying drawings, wherein.

DESCRIPTION OF A PREFERRED EMBODIMENT

Figure 1:
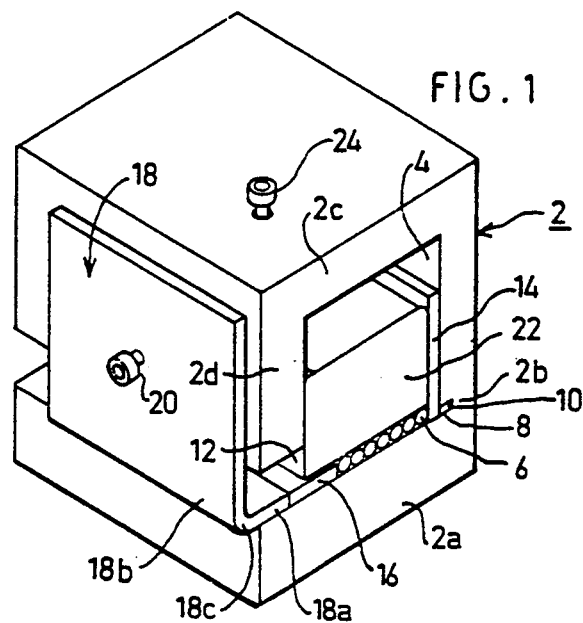
FIG. 1 is a view illustrating one form of fibre optic head constructed in accordance with the present invention.

The fibre optic head illustrated in the drawings comprises a housing, generally designated 2, formed with an internal cavity 4 for receiving a plurality of optical fibres 6 to be fixed in a precise linear array. In the example illustrated in the drawings, there are eleven optical fibres 6, each formed with an outer opaque cladding.

For supporting the plurality of optical fibres 6 in a precise linear array, the bottom wall 2a of housing 2 constitutes a first side of cavity 4 and is formed with a perfectly flat inner surface 8, defining the lower end of cavity 4, for supporting the plurality of optical fibres 6. The flat surface 8 continues, in the form of a recess 10, partly into side wall 2b of housing 2 defining a second side of cavity 4. A third side of the cavity opposite to side wall 2b is defined by side wall 2d, the latter side wall terminating short of the housing bottom wall 2a to define a slot 12. The fourth or upper side of cavity 4, i.e. opposite to the bottom wall 2a, is defined by top wall 2c of the housing. As will be described more particularly below, the optical fibres 6 are inserted via slot 12 into cavity 4 and are moved towards the opposite side of the cavity defined by the housing side wall 2b.

A sheet 14 is disposed within cavity 4 of housing 2 to extend perpendicularly to the flat supporting surface 8 at the side of cavity 4 occupied by side wall 2b. Sheet 14 has a flat bottom edge 14a adapted to firmly abut the flat supporting surface 8, and a flat side face 14b against which the end optical fibre 6 abuts.

Housing 2 receives a second sheet 16 via its slot 12 at the opposite side of its cavity 4 defined by the housing side wall 2d. Sheet 16 is supported on the flat surface 8 of the housing so as to be parallel to that supporting surface, and is formed with a flat edge 16a adapted to abut against the optical fibre 6 at that side of the housing cavity 4.

In the assembled condition of the head, sheet 16 is pressed against the optical fibres 6 by a further sheet 18 having a first section 18a abutting against edge 16b of sheet 16, and therefore also parallel to the flat supporting surface 8 of cavity 4, and a second section 18b extending perpendiclarly to the flat supporting surface 8. Section 18b of sheet 18 is secured to the side wall 2d of housing 2 by a threaded pin 20 passing through the upper end of section 18b. The lower end of section 18b is joined to section 18a of the sheet by a bent elastic juncture 18c which is effective to press sheet section 18a against edge 16b of sheet 16, thereby causing sheet 16 to press against the end optical fibre 6 on the flat supporting surface 8.

Housing 2 includes additional pressure means, in the form of a block 22, at the upper end of cavity 4. Block 22 is formed with a flat undersurface 22a effective to engage the upper surfaces of the linear array of optical fibres 6 and to press them against the flat supporting surface 8 of the housing. The pressure applied by block 22 to the linear array of optical fibres 6 may be adjusted by a threaded pin 24 passing through the top wall 2c of the housing and engageable with the upper face of block 22.

As will be described more particularly below, during an early phase in the assembling of the linear array of optical fibres 6 within housing 2, block 22 is supported at a predetermined position within the housing cavity 4 by means of another threaded pin 26 (FIG. 2) passing through side wall 2d of the housing. This temporary position for supporting block 22 is determined by a spacer element 28 (FIG. 2) received on the flat supporting surface 8 of the housing bottom wall 2a. Spacer element 28 is of a hard rigid material, such as stainless steel, and is of a thickness slightly larger than the diameter of the optical fibres 6. During an initial phase of the assembling in the optical fibres, spacer 28 is received on the flat supporting surface 8 of the housing 2, and spaces block 22 within the housing cavity 4 so that the lower surface of block 22 is slightly spaced from the upper surfaces of the optical fibres 6 as they are inserted via side slot 12. During this initial stage in the assembling of the linear array of the optical fibres 6, block 22 is retained in an initial position by threaded pin 26 passing through the housing side wall 2d. However, after this initial stage in the assembling of the linear array of optical fibres 6, the spacer 28 and threaded pin 26 are no longer needed and are therefore removed, so that they are not present in the final assembly of the fibre optic head as illustrated in FIG. 1.

Figure 2:
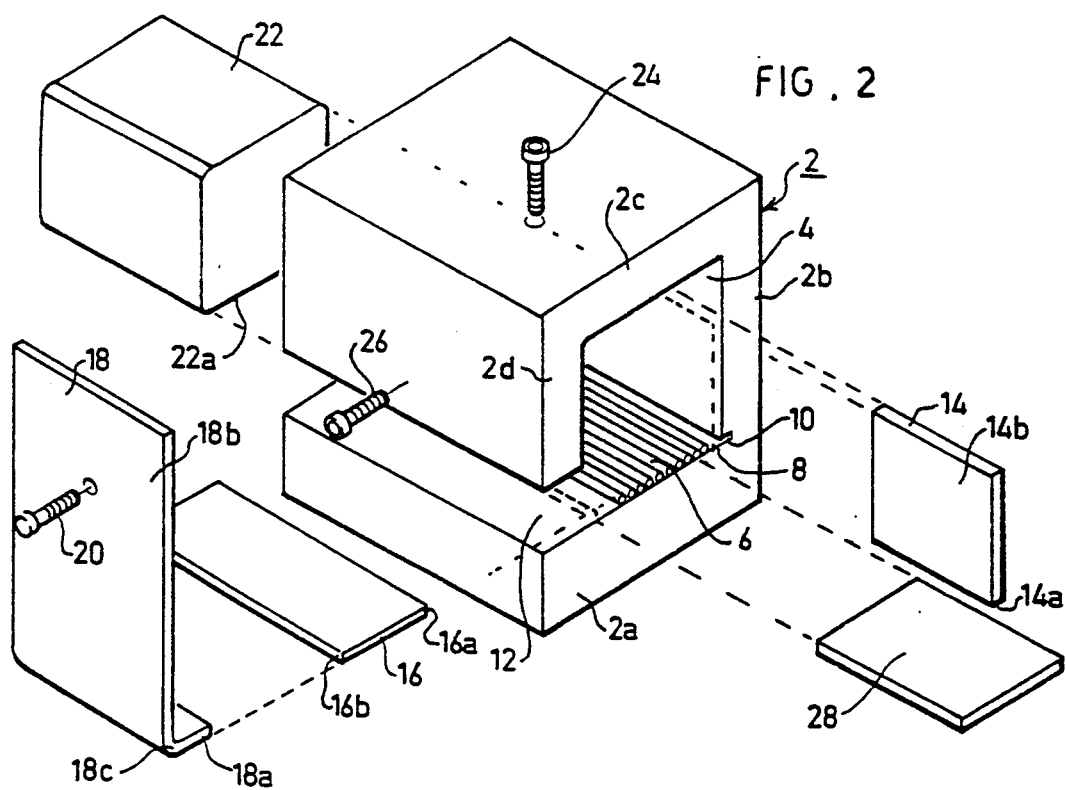
FIG. 2 is an exploded three-dimensional view more particularly illustrating the construction of the fibre optic head of FIG. 1.

The fibre optic head illustrated in FIGS. 1 and 2 may be assembled as follows:

First, the protective coating on the optical fibres 6 to be assembled is first removed for the complete length of the optical fibres to be disposed within housing 2, plus an additional 5 mm.

The bottom spacer 28 is then inserted into the housing on top of the flat upper surface 8 of the housing bottom wall 2a. Spacer 28 is of a width so as not to cover the right side of the flat surface 8 adjacent to the housing side wall 2b or its recess 10.

The side spacer sheet 14 is then inserted against the housing side wall 2b to cover its recess 10, with the bottom flat edge 14a of the sheet in abutting contact with the flat surface 8 of the housing bottom wall 2a. Spacer sheet 14 thus defines the end of the cavity 4 to be engaged by the end optical fibre 6. This arrangement, including spacer sheet 14 and recess 10, produce a more precise end of the cavity to receive the optical fibres 6 than would be produced by merely forming the cavity with a right-angle corner. Thus, a perfect right-angle corner cannot be machined even with high precision instruments, but rather produces some rounding of the corner.

After the bottom spacer 28 and the side spacer sheet 14 have thus been placed in the housing cavity 4, spacer block 22 is inserted within the cavity, and threaded pin 24 is rotated to press the bottom face of the block against the bottom spacer 28. Pin 26 is then threaded through the housing side wall 2d to engage spacer block 22 and thus to fix the spacer block in this position. The bottom spacer 28 is then removed while block 22 is held in position by threaded pin 26.

As mentioned earlier, spacer 28 is of a thickness slightly larger than the diameter of the optical fibres 6 to be assembled, so that its removal will define a space between block 26 and the flat surface 8 of the housing bottom wall 2a for the reception of the optical fibres.

At this point, the optical fibres are coated with an adhesive and then inserted individually via the side slot 12 into the space between block 22 and flat surface 8 of the housing bottom wall 2a. As each fibre is inserted via side slot 12, it is moved towards housing side wall 2b at the opposite end of cavity 4 with the aid of sheet 16. Thus, the first optical fibre 6 so inserted is moved into engagement with the spacer sheet 14 at that side of the cavity, and the next fibres are then individually inserted, one after the other, and are moved with the aid of sheet 16 into abutting contact with each preceding optical fibre.

The foregoing placements of the optical fibres are visually inspected by using a stereo-microscope to assure that the optical fibres assume a straight-line, side-by-side arrangement; if there is any deviation from the straight line, threaded pin 24 is rotated to lower block 22 into engagement with the upper faces of the inserted optical fibres, and thereby to straighten them out.

After all (eleven in the illustrated example) of the optical fibres have been so applied, sheet 16 is inserted via the side slot 12 to cause its edge 16a to engage the end optical fibre 6 of the array. Threaded pin 26 is then removed, and threaded pin 20 is applied to fix sheet 18 to the housing side wall 2d with its lower, horizontal section 18a in abutting contact with edge 16b of sheet 16. When sheet 18 is so attached to the housing 2, the bent elastic juncture 18c, between sections 18b and 18a of sheet 18, applies pressure via sheet 16 to the line of optical fibres 6 pressing them into firm abutting contact with each other.

More adhesive is then applied to fill the spaces between the optical fibres 6 and the surfaces 8 and 22a on their opposite sides; pin 24 is threaded downwardly to press surface 22a of block 22 against the upper faces of the optical fibres 6; and pin 20 is threaded inwardly to cause section 18a of sheet 18, abutting against sheet 16, to firmly press the optical fibres into abutting contact with each other.

The so assmbled head is then dried to firmly bond the optical fibres in their assembled positions; and the projecting ends of the optical fibres 6 are cut and polished.

As one example, wherein eleven optical fibres are thus assembled in a linear array, each of the optical fibres may have a diameter of 125 microns; the bottom spacer 28 may be of stainless steel having a thickness of 130 microns; the three sheets 14, 16 and 18 may be of a polyester film having a thickness of about 100 microns;

and the housing 2 and block 22 may both be of aluminum.

While the invention has been described with respect to producing a fibre optic head including eleven optical fibres, it will be appreciated that it could be used in producing fibre optic heads having a smaller or larger number of optical fibres, preferably from 2 to 20 fibres. The invention could also be used for making other forms of assemblies including a plurality of elongated elements 6 fixed in a precise linear array, such as a linear array of electrodes. Many other variations, modifications and applications of the invention will be apparent.

What is claimed is:

1. An assembly of a plurality of elongated elements fixed in a precise linear array, comprising:
   a housing formed with an internal cavity having a flat supporting surface at one side thereof;
   a flat sheet extending perpendicularly to said flat supporting surface at a second side of said cavity and having a flat edge abutting said flat supporting surface;
   said plurality of elongated elements being supported in side-by-side relation on said flat supporting surface;
   first pressure means at a third side of said cavity opposite to said second side and pressing said elongated elements into contacting relation with each other, and the end elongated element into contact with said flat sheet;
   and second pressure means in a fourth side of said cavity opposite to said first side and pressing all said elongated elements into contact with said flat supporting surface.

2. The assembly according to claim 1, further including an adhesive bonding said elongated elements to each other and to said housing.

3. The assembly according to claim 1, wherein the side wall of the housing at said second side of the cavity is formed with a slot aligned with said flat supporting surface.

4. The assembly according to claim 1, wherein said first pressure means comprises a second flat sheet extending parallel to said flat supporting surface and engageable with the elongated element at said third side of the cavity, and elastic means for pressing said second sheet towards said first-mentioned sheet.

5. The assembly according to claim 4, wherein said elastic means includes a third sheet having a first section parallel to said first-mentioned sheet, a second section parallel to said second sheet and aligned therewith, and a bent elastic juncture joining said first and second sections.

6. The assembly according to claim 5, wherein said elastic means further includes a threaded pin passing through a wall of the housing and through said first section of said third sheet.

7. The assembly according to claim 1, wherein said second pressure means includes a block having a flat undersurface engageable with said elongated elements, and a threaded pin passing through a wall of the housing and engageable with said block for pressing it against said elongated elements.

8. The assembly according to claim 7, further including a threaded pin passing through a wall of the housing for fixing the block in position within the cavity.

9. The assembly according to claim 5, wherein said linear array of elongated elements are optical fibres.

10. The assembly according to claim 9, wherein said optical fibres are each of a diameter of less than ½ mm.

11. The assembly according to claim 10, wherein said linear array includes at least eight optical fibres.

12. The assembly according to claim 10, wherein each of said sheets of polyester material are of a thickness slightly less than the diameter of the optical fibres.

13. An optical fibre head including a plurality of optical fibres fixed in a precise linear array, comprising:
   a housing formed with an internal cavity having a flat supporting surface at one side thereof;
   a flat sheet extending perpendicularly to said flat supporting surface at a second side of said cavity and having a flat edge abutting said flat supporting surface;
   said plurality of optical fibres being supported in side-by-side relation on said flat supporting surface;
   first pressure means at a third side of said cavity opposite to said second side and pressing said optical fibres into contacting relation with each other, and the end optical fibre into contact with said flat sheet;
   and second pressure means in a fourth side of said cavity opposite to said first side and pressing all said optical fibres into contact with said flat supporting surface.

14. The assembly according to claim 13, further including an adhesive bonding said optical fibres to each other and to said housing.

15. The assembly according to claim 13, wherein the side wall of the housing at said second side of the cavity is formed with a slot aligned with said flat supporting surface.

16. The assembly according to claim 13, wherein said first pressure means comprises a second flat sheet extending parallel to said flat supporting surface and engageable with the optical fibre at said third side of the cavity, and elastic means for pressing said second sheet towards said first-mentioned sheet.

17. The assembly according to claim 16, wherein said elastic means includes a third sheet having a first section parallel to said first-mentioned sheet, a second section parallel to said second sheet and aligned therewith, and a bent elastic juncture joining said first and second sections.

18. The assembly according to claim 17, wherein said elastic means further includes a threaded pin passing through a wall of the housing and through said first section of said third sheet.

19. A method of making an assembly of a plurality of elongated elements in a precise linear array, comprising:
   forming a housing with an internal cavity having a precisely flat supporting surface on one side thereof;
   applying a flat sheet perpendicularly to said flat supporting surface at a second side of said cavity and having a flat edge abutting said flat supporting surface;
   applying from a third side of said cavity, opposite to said second side, a plurality of elongated elements one at a time so as to be supported in side-by-side relation on said flat supporting surface;
   applying pressure from said third side of the cavity to press said elongated elements into contacting relation with each other, and the end elongated element into contact with the flat sheet;
   and applying pressure from a fourth side of the cavity, opposite to said first side, to press all said elongated elements into contact with said flat supporting surface.

20. The method according to claim 19, including the further step of applying an adhesive to bond all said elongated elements together and to said housing.

* * * * *